United States Patent
Lee

(10) Patent No.: US 6,731,345 B2
(45) Date of Patent: May 4, 2004

(54) METHOD AND APPARATUS FOR SETTING ON-TIMER CHANNEL OF DIGITAL BROADCAST RECEIVER

(75) Inventor: Kyu Heon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 337 days.

(21) Appl. No.: 09/766,406

(22) Filed: Jan. 22, 2001

(65) Prior Publication Data

US 2001/0010097 A1 Jul. 26, 2001

(30) Foreign Application Priority Data

Jan. 22, 2000 (KR) ........................................ 2000/3090

(51) Int. Cl.⁷ ................................................ H01N 5/44
(52) U.S. Cl. ...................................... 348/553; 348/730
(58) Field of Search ................................ 348/730, 553, 348/731; 725/58

(56) References Cited

U.S. PATENT DOCUMENTS

| | | | | |
|---|---|---|---|---|
| 4,272,784 A | * | 6/1981 | Saito et al. ..................... | 386/83 |
| 4,706,121 A | * | 11/1987 | Young ........................ | 358/142 |
| 5,031,213 A | * | 7/1991 | Kawasaki .................... | 725/31 |
| 5,870,150 A | * | 2/1999 | Yuen .......................... | 348/553 |
| 6,177,931 B1 | * | 1/2001 | Alexander et al. .......... | 345/327 |
| 6,337,719 B1 | * | 1/2002 | Cuccia ........................ | 348/731 |
| 6,344,878 B1 | * | 2/2002 | Emura ........................ | 348/460 |
| 6,493,876 B1 | * | 12/2002 | DeFreese et al. ........... | 725/100 |

FOREIGN PATENT DOCUMENTS

| | | | | | |
|---|---|---|---|---|---|
| JP | 03214919 A | * | 9/1991 | ............ | H03J/7/18 |
| JP | 05284478 A | * | 10/1993 | ............ | H01N/7/08 |

* cited by examiner

*Primary Examiner*—Victor R. Kostak
(74) *Attorney, Agent, or Firm*—Birch, Stewart, Kolasch & Birch, LLP

(57) ABSTRACT

An ON-timer channel setting apparatus of a digital broadcast receiver in which a user sets an ON-timer channel and a TV receiver is turned on at a preset time, includes: a tuner for tuning a received signal through an antenna; a TP demux unit for separating the signal tuned by the tuner into an audio, a video and a data signal and outputting the same; an A/V decoding unit for converting the signal received from the TP demux unit into an audio and a video signal; a display unit for displaying the audio and the video signals outputted from the A/V decoding unit on a screen; and a controlling unit for parsing the data signal received from the TP demux comparing and controlling the detected data information and the channel information set by a user, and outputting data information of an active channel in a form suitable to be displayed to the display unit. The channel set as an ON-timer by the user and the channel information of the program guide are compared such that a channel is selected among the substantially active channel at the time set by the user.

20 Claims, 3 Drawing Sheets

FIG. 5

| CHANNEL EDIT | | | | | | |
|---|---|---|---|---|---|---|
| | 2-0 | 15-0 | 34-0 | 62-0 | 112 | 143 |
| CH. 4 - 1 | 4-0 | 15-1 | 35-0 | 63-1 | 115 | 145 |
| | 4-1 | 46-0 | 35-2 | 69-2 | 116 | 146 |
| | 5-0 | 47-0 | 40-0 | 130 | 118 | 150 |
| | 5-1 | 19-0 | 43-0 | 104 | 119 | 155 |
| | 7-0 | 23-0 | 53-0 | 105 | 120 | 159 |
| | 9-0 | 25-0 | 55-0 | 108 | 122 | 160 |
| | 12-0 | 29-0 | 55-1 | 109 | 130 | 169 |
| | 12-1 | 31-0 | 55-3 | 110 | 133 | 170 |

METHOD AND APPARATUS FOR SETTING ON-TIMER CHANNEL OF DIGITAL BROADCAST RECEIVER

BACKGROUND OF THE INVENTION

1. Field of the Invention

The present invention relates to a technique for implementing a TURN-ON reservation in a digital and satellite broadcast receiver, and more particularly to a method and apparatus for setting an ON-timer channel of a digital and satellite broadcast receiver which sets and operates an ON-timer channel so that viewers can always watch a program broadcast through an active channel at a desired time in a digital TV, a digital set-top box or a digital satellite broadcast set-top box which provides the ON-timer function.

2. Description of the Background Art

Generally, a TV receiver has a function that it is automatically turned on at a time reserved by a user, for which, thus, the user may set a desired channel in advance and the TV receiver is turned on at a desired time. The function that the TV receiver is automatically turned on at a reserved time is called ON-timer function.

FIG. 1 is a schematic block diagram of a general ON-timer channel setting apparatus of a digital broadcast receiver in accordance with a conventional art.

As shown in the drawing, the general ON-time channel setting apparatus of a digital broadcast receiver includes a tuner 10 for tuning a signal received through an antenna; a TP demux unit 20 for separating the signal tuned by the tuner 10 into an audio, a video and a data signals and outputting the same; an A/V decoding unit 30 for converting the signal received from the TP demux unit 20 into an audio and a video signals; a display unit 50 for displaying the audio and the video signals outputted from the A/V decoding unit 30 on a screen; and a controlling unit 40 for parsing the data signal detected from the TP demux 20 and outputting data information in a form suitable to be displayed to the display unit 50.

The controlling unit 40 includes a DB engine 41 for parsing the data signal provided from the TP demux 20 and a memory 42 for storing the data information parsed by the DB engine 41.

The operation of the ON-timer setting apparatus of the general digital receiver constructed as described above will now be explained.

First, after the signal received through the antenna is tuned by the tuner 10, and the tuned signal is separated into an audio, a video and a data signal by the TP demux unit 20.

And then, the A/V decoding unit 30 receives the audio and the video signals outputted from the TP demux unit 20, converts and displays them on the screen.

Meanwhile, the controlling unit 40 receives the data signal from the TP demux unit 20, extracts and stores required information, and transmits information to the display unit 50 upon a user's request.

Thus, when the user sets a channel by using the ON-timer function in a channels setting mode, the set channel is turned on at the time set by the user.

However, in case of the digital and satellite broadcast receiver (referred to as a digital broadcast receiver, hereinbelow), it happens frequently that a channel set by the user is not displayed, resulting in that the user is not able to watch a desired program. Thus, the user should remember the channel number and inputs a desired channel in person in case.

The reason for this is that, in case of satellite broadcast, channels are mostly marked by a logo, and in case of the digital broadcast, in setting a channel, the channels exist in a major and a minor form from the viewpoint of characteristics of a virtual channel, which are mobile, not fixed.

In addition, even through the user remembers the desired channel and sets an ON-timer channel, when the TV receiver is turned on at the time set by the user, the channel happens not to be an active channel. In this case, the user should operates the channel again to convert it into an active channel.

The active channel means a channel that broadcasting is substantially conducted at the time to be set by the ON-timer by the user, which is because the virtual channel is mobile, not fixed. That is, the active channel signifies the existence of the channel itself.

Thus, the conventional digital broadcast receiver causes much inconvenience for the above described reasons.

SUMMARY OF THE INVENTION

Therefore, an object of the present invention is to provide an ON-timer channel setting method and apparatus of a digital broadcast receiver in which after a user sets a channel as an ON-timer channel, when a TV receiver is turned on at the pre-set time, the active channel is substantially selected from the digital channel, a virtual channel, so that the user can always watch a TV program on the air as the digital broadcast receiver is automatically turned on by virtue of the ON-timer function.

Another object of the present invention is to provide an ON-timer channel setting method and apparatus of a digital broadcast receiver by which even though a user does not accurately remember a channel number, an active channel can be set conveniently with digital channels, virtual channels.

To achieve these and other advantages and in accordance with the purpose of the present invention, as embodied and broadly described herein, there is provided an ON-timer channel setting apparatus of a digital broadcast receiver including: a tuner 10 for tuning a received signal through an antenna; a TP demux unit 20 for separating the signal tuned by the tuner 10 into an audio, a video and a data signals and outputting the same; an A/V decoding unit 30 for converting the signal received from the TP demux unit 20 into an audio and a video signals; a display unit 50 for displaying the audio and the video signals outputted from the A/V decoding unit 30 on a screen; and a controlling unit 40 for parsing the data signal detected from the TP demux 20 and outputting data information in a form suitable to be displayed to the display unit 50.

In the above apparatus, the controlling unit 40 includes a DB engine 41 for parsing the data signal provided from the TP demux 20, a memory 42 for storing the data information parsed by the DB engine 41 and a channel manager 43 for comparing and controlling the data information detected from the DB engine 41 and the memory 42.

In order to achieve the above objects, there is also provided an ON-timer channel setting method of a digital broadcast receiver in which a broadcast signal is received and a menu screen is outputted as an On Screen Display, including: a step in which in case that a digital broadcast receiver provides a channel list or a category channel list of channels frequently viewed by viewers and there is a channel added by a user, whenever the user depresses an up/down key of a remote controller, corresponding channels are sequentially displayed of which a desired channel is set as an ON-timer; a step in which in case that the digital broadcast receiver does not provide a channel list or in case that the digital broadcast receiver does provide a channel list but not include a desired channel, active channels of a channel map of the digital broadcast receiver are sequentially displayed and desired channels of the active channels are set as ON-timer channels; and a step in which when the digital broadcast receiver provides a program guide, only substantially active channels out of the above channels are displayed at a time set in the ON-timer menu, of which desired channels are set as ON-timer channels.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is an exemplary view of a channel editing menu implemented on an On Screen Display in accordance with the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
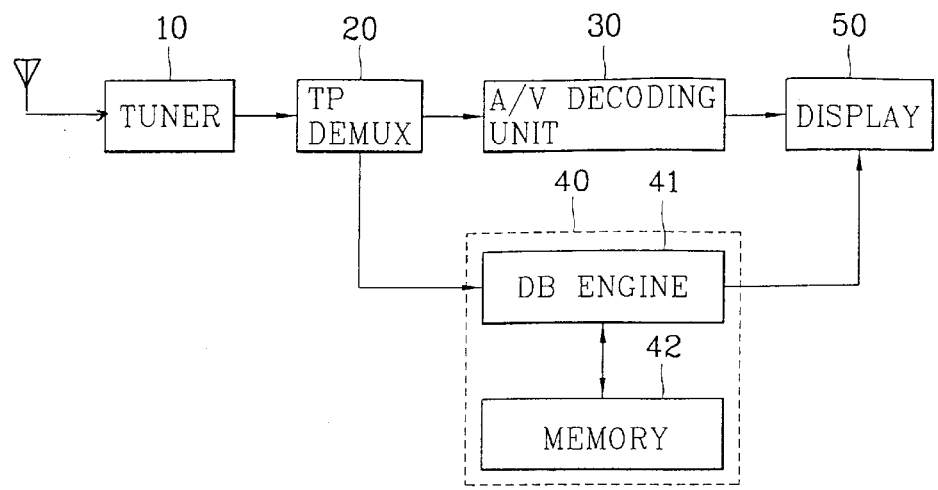
FIG. 1 is a schematic block diagram of an ON-timer channel setting apparatus of a general digital broadcast receiver in accordance with a conventional art.
Figure 2:
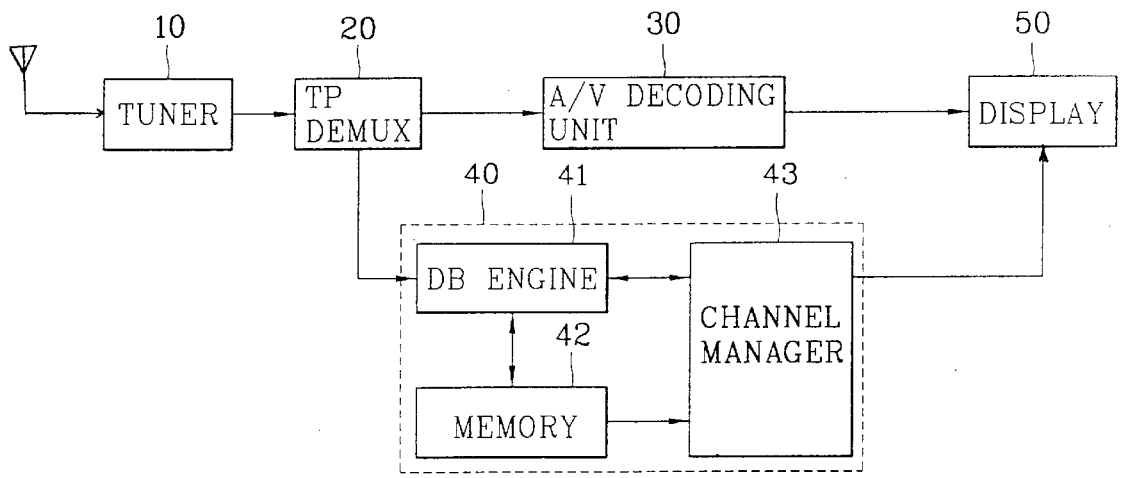
FIG. 2 is a schematic block diagram of an ON-timer channel setting apparatus of a digital broadcast receiver in accordance with the present invention.

FIG. 2 is a schematic block diagram of an ON-timer channel setting apparatus of a digital broadcast receiver in accordance with the present invention. As shown in the drawing, the ON-timer channel setting apparatus of a digital broadcast receiver of the present invention includes: a tuner 10 for tuning a received signal through an antenna; a TP demux unit 20 for separating the signal tuned by the tuner 10 into an audio, a video and a data signals and outputting the same; an A/V decoding unit 30 for converting the signal received from the TP demux unit 20 into an audio and a video signals; a display unit 50 for displaying the audio and the video signals outputted from the A/V decoding unit 30 on a screen; and a controlling unit 40 for parsing the data signal detected from the TP demux 20 and outputting data information in a form suitable to be displayed to the display unit 50.

In the above apparatus, the controlling unit 40 includes a DB engine 41 for parsing the data signal provided from the TP demux 20, a memory 42 for storing the data information parsed by the DB engine 41 and a channel manager 43 for comparing the data information detected from the DB engine 41 and the memory 42 with channel information set by the user, and controlling them.

The operation of the ON-timer setting apparatus of a digital broadcast receiver constructed as described above will now be explained.

First, after the signal received through the antenna is turned by the tuner 10, the tuned signal is separated into an audio, a video and a data signal by the TP demux unit 20, to be outputted. The A/V decoding unit 30 receives the audio and video signals outputted from the TV demux unit 20, converts and displays them on the screen.

Meanwhile, the controlling unit 40 receives the data signal from the TP demux unit 20, parses required information and stores it in the memory 42. And then, the controlling unit 40 compares the data information stored in the memory 42 and the channel information inputted by the user and transmits an active channel information to the display unit 50.

That is, in case of the digital broadcast, since digital channels exist in a major and a minor form from the viewpoint of characteristics of the virtual channel, which are mobile, not fixed, they may not exist in a certain time.

Accordingly, in case where the channel manager is provided, it can search and compare the channel set by the user and the channel information of a program guide, to select a desired channel among the substantially active channels at that time, so that when the digital broadcast receiver is automatically turned on by virtue of the ON-timer function, the user can always watch a TV program which is currently on the air.

Figure 3:
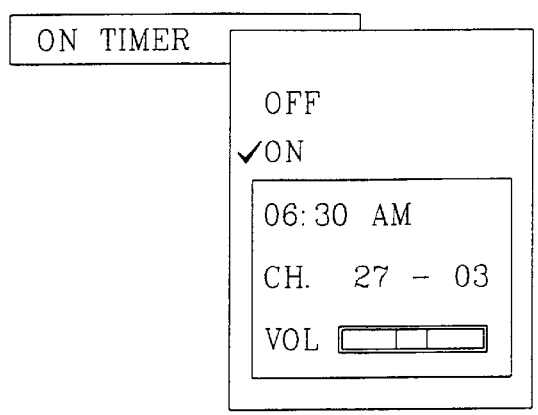
FIG. 3 is an exemplary view of an ON-timer setting menu implemented on an On Screen Display in accordance with the present invention.

FIG. 3 is an exemplary view of an ON-timer setting menu implemented on an On Screen Display in accordance with the present invention.

The setting menu implemented on the OSD includes a time setting unit for reserving a channel set time, a channel selecting unit for inputting a channel directly by the user, and a volume setting unit for controlling a volume state.

In this respect, in case that the portion corresponding to the ON-timer channel is highlighted, the user may set a desired channel by using the channel or the up/down key to set the ON-timer.

Generally, in case the user may not remember channels fully, the digital broadcast receiver provides a favorite channel list for making a channel list for channels that are favored by the user, a category channel list for major broadcast channels which are selectively collected by digital broadcast receiver providers or a channel list edited by the user. Or the digital broadcast receiver may provide a program guide as necessary.

Accordingly, the channels on the channel list are considered channels that are frequently viewed or favored by the user, and the ON-timer channel is set by using the channel list.

Figure 4:
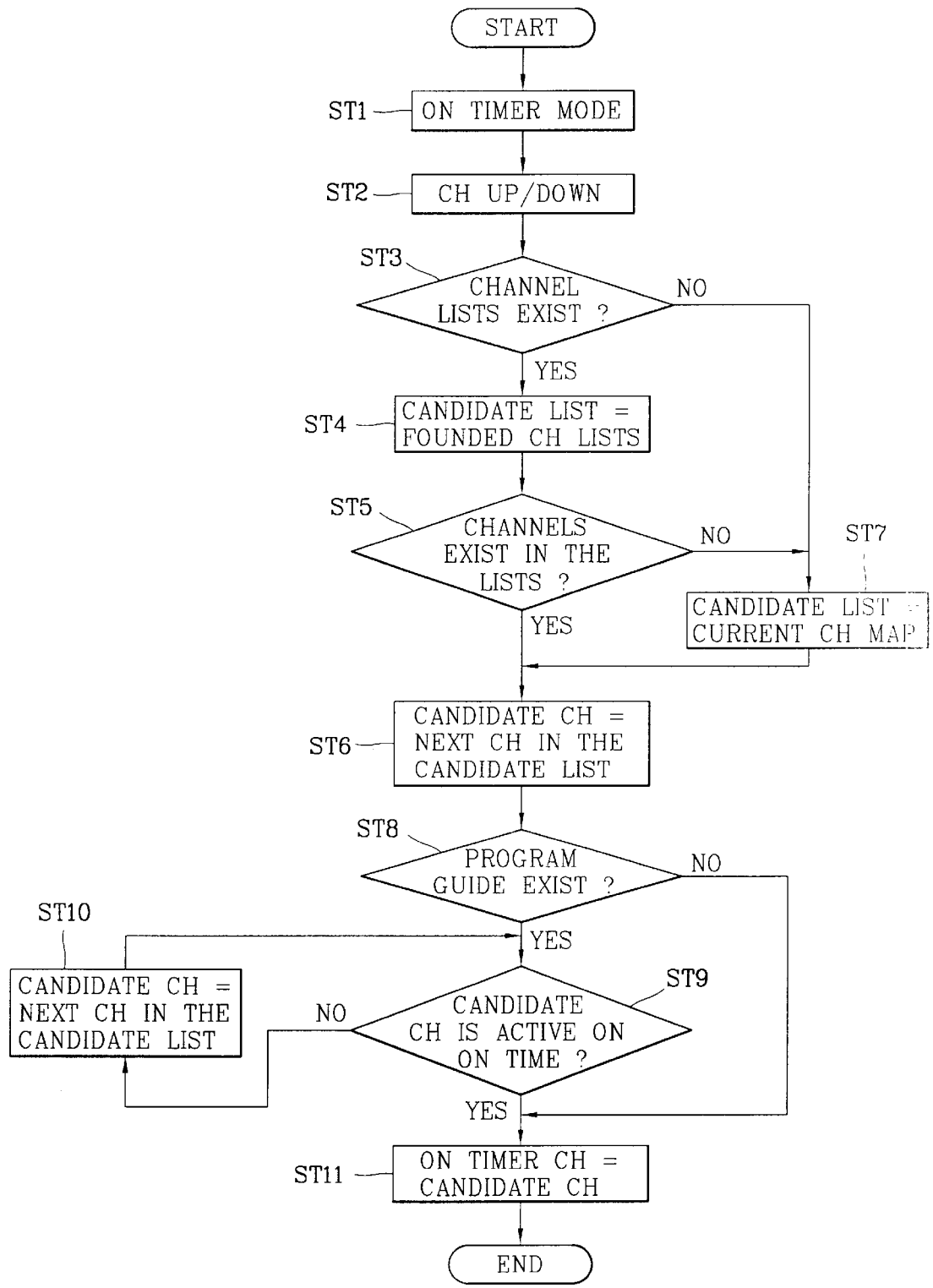
FIG. 4 is a flow chart of an ON-timer channel setting method of a digital broadcast receiver in accordance with the present invention.

FIG. 4 is a flow chart of an ON-timer channel setting method of a digital broadcast receiver in accordance with the present invention.

When the ON-timer channel setting mode is highlighted, the user manipulates the channel or the up/down key of the remote controller to check whether there is a favorite channel list (ST1~ST3), and a discovered channel list becomes a candidate list (ST4). And, when it is discriminated that the candidate list includes channels as set by the user, the corresponding candidate channels are sequentially displayed as the up/down key is depressed, of which desired candidate channels are set as ON-timer channels (ST5~ST6).

Meanwhile, in case that the digital broadcast receiver does not provide a channel list or in case that the digital broadcast receiver does provide a channel list in which, however, there is no favorite channel, the candidate channels of the channel map currently held by the digital broadcast receiver are sequentially displayed, so that desired channels can be set as ON-timer channels (S7).

In case that the digital broadcast receiver provides a program guide, only the substantially active candidate channels out of the candidate channels are displayed at the time as set in the ON-timer setting menu, of which desired channels are set as ON-timer channels (ST8~ST11).

Accordingly, the user can set a desired channel from the active channels easily and conveniently, without a need to remember the numerous channels fully of the digital broadcast receiver which are marked as a major one or a minor one from the viewpoint of characteristics of the virtual channel in which the channels exist mobile.

Meanwhile, in case that the user sets an ON-timer channel in person without entering the ON-timer channel setting mode, a timer key is provided in the remote controller so as for the user to set the ON-timer channel in person.

The method for setting an ON-timer channel directly by the user by using the timer key will now be described.

In case that the digital broadcast receiver provides the program guide, since brief or full information on the channel are displayed when the channel in the program guide is highlighted, in this state, the user sets ON-timer channels by depressing the timer key.

In case of watching a general program of a channel, the user may set the channel which he or she is watching a program thereof as an ON-timer channel by depressing the timer key.

FIG. 5 is an exemplary view of a channel editing menu implemented on an On Screen Display in accordance with the present invention.

When a channel editing mode is highlighted on the OSD as shown in FIG. 5, the corresponding channel is set as an ON-timer channel by using the timer key.

As so far described, according to the method and apparatus for setting an ON-timer channel of a digital and satellite broadcast receiver, the channel set as an ON-timer by the user and the channel information of the program guide are compared and searched and a channel is selected among the substantially active channel at the time set by the user. Accordingly, when the digital broadcast receiver is automatically turned on according to the ON-timer function, the user can always watch the program on the screen which is currently on the air.

In addition, the user can set a desired channel easily, without a need to remember the numerous channels fully of the digital broadcast receiver which are marked as a major one or a minor one from the viewpoint of characteristics of the virtual channel in which the channels exist mobile.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An ON-timer channel setting apparatus for a digital broadcast receiver in which a user sets an ON-timer channel and a TV receiver is turned on at a pre-set time, comprising:

a tuner for tuning a received signal;

a demux unit for separating the signal tuned by the tuner into audio, video and data signals and outputting the separate signals;

an A/V decoding unit for converting the signal received from the demux unit into audio and video signals;

a display unit for displaying the audio and video signals outputted from the A/V decoding unit on a screen; and a controlling unit for parsing the data signal received from the demux unit to detect channel information, comparing the detected channel information with a channel set by a user, and outputting data information of an active channel based on the comparison result.

2. The apparatus according to claim 1, wherein the data information outputted from the controlling unit includes a channel list, a category channel list, a channel added by the user or a program guide.

3. The apparatus according to claim 1, wherein in case that the digital broadcast receiver does not provide a channel list, or in case that the digital broadcast receiver does provide a channel list but does not include desired channels therein, the controlling unit sequentially displays a list of active channels and sets desired channels as ON-timer channels.

4. The apparatus according to claim 2, wherein the controlling unit controls to set an ON-timer for an active channel displayed on the program guide among the channel list, the category channel list or the channels added by the user, and to display an active picture image on the display unit at a set time.

5. The apparatus according to claim 1, wherein the controlling unit includes:

a DB engine for parsing the data signal provided from the demux unit;

a memory for storing the channel information parsed by the DB engine; and a channel manager for comparing the channel information detected from the DB engine with the channel set by the user and selecting an active channel corresponding to the channel set by the user for a set time based on the comparison result.

6. The apparatus according to claim 5, wherein the channel manager compares the detected channel information and the channel set by the user, and selects a corresponding active channel among active channels for the set time, so that the user can always watch a TV program that is currently on the air when the digital broadcast receiver is automatically turned on by virtue of the ON-timer function.

7. An ON-timer channel setting method of a digital broadcast receiver in which a broadcast signal is received and a menu screen is displayed, comprising:

a step (a) of tuning a signal received, separating the received signal into an audio, a video and a data signal so as to be outputted, and converting the audio and video signals and displays them on the screen; and a step (b) of parsing required information from the data signal and storing the parsed information in a memory, comparing the parsed information stored in the memory with a channel inputted by the user, and transmitting active channel information to a display unit based on the comparison result.

8. An ON-timer channel setting method of a digital broadcast receiver in which a broadcast signal is received and a menu screen is displayed, comprising:

a step (a) in which in case that the digital broadcast receiver provides a list of favorite channels viewed by a user, the user sets desired channels from the favorite channel list as ON-timer channels; and a step (b) in which in case that the digital broadcast receiver provides a program guide, only substantially active channels are displayed for a time set in an ON-timer setting menu, and the user sets desired active channels from the displayed active channels as ON-timer channels.

9. The method according to claim 8, wherein in case that the digital broadcast receiver does not provide a channel list or in case that the digital broadcast receiver does provide a channel list but does not include a desired channel, active channels of a channel map of the digital broadcast receiver are sequentially displayed and desired channels of the active channels are set as ON-timer channels.

10. The method according to claim 8, wherein active channels are sequentially displayed by using a channel or an up/down key of a remote controller and desired channels are set as ON-timer channels.

11. The method according to claim 8, wherein when the digital broadcast receiver provides the program guide, when a general channel list is provided in the program guide, or in a channel editing mode, the user directly sets an ON-timer channel by using a timer key of a remote controller.

12. The method according to claim 8, wherein the ON-timer setting menu includes a function for reserving a channel setting time, a function for inputting a channel by a user and a function for controlling a volume state.

13. The apparatus according to claim 1, wherein the controlling unit compares the detected channel information with the channel set by the user, selects an active channel corresponding to the channel set by the user for a set time, and output information on the selected active channel to the display unit for display at the set time.

14. The apparatus according to claim 13, wherein the user sets the channel by directly entering a desired channel number or using a channel up/down key.

15. The apparatus according to claim 13, wherein the user sets the channel by using a favorite channel list or a timer key.

16. The method according to claim 7, wherein the step (b) compares the parsed information with the channel inputted by the user, selects an active channel corresponding to the channel inputted by the user for a set time, and output the active channel information on the selected active channel to the display unit for display at the set time.

17. The method according to claim 16, wherein the user inputs the channel by using a favorite channel list or a timer key.

18. The method according to claim 8, further comprising:

a step (c) of comparing detected channel information with a channel set by the user, selecting an active channel corresponding to the channel set by the user for a set time based on the comparison result, and output information on the selected active channel to a display unit for display at the set time.

19. The method according to claim 8, wherein in the step (b), the user sets the ON-timer channels from the program guide using a timer key.

20. An ON-timer channel setting method of a digital broadcast receiver in which a broadcast signal is received and a menu screen is displayed, comprising:

a step in which in case that the digital broadcast receiver provides a list of favorite channels viewed by a user, the user sets desired channels from the favorite channel list as ON-timer channels;

a step in which in case that the digital broadcast receiver does not provide a list of favorite channels, active channels of a channel map of the digital broadcast receiver are sequentially displayed, and the user sets desired channels from the displayed active channels as ON-timer channels;

a step in which in case that the digital broadcast receiver provides a program guide, only substantially active channels are displayed for a time set in an ON-timer setting menu, and the user sets desired active channels from the displayed active channels as ON-timer channels; and a step of comparing detected channel information with a channel set by the user, selecting an active channel corresponding to the channel set by the user for a set time based on the comparison result, and outputting information on the selected active channel to a display unit for display at the set time.

* * * * *